Feb. 25, 1930. J. F. CULLIN 1,748,381
ELECTRICAL INSULATION AND MEANS FOR MAKING THE SAME
Filed June 8, 1927
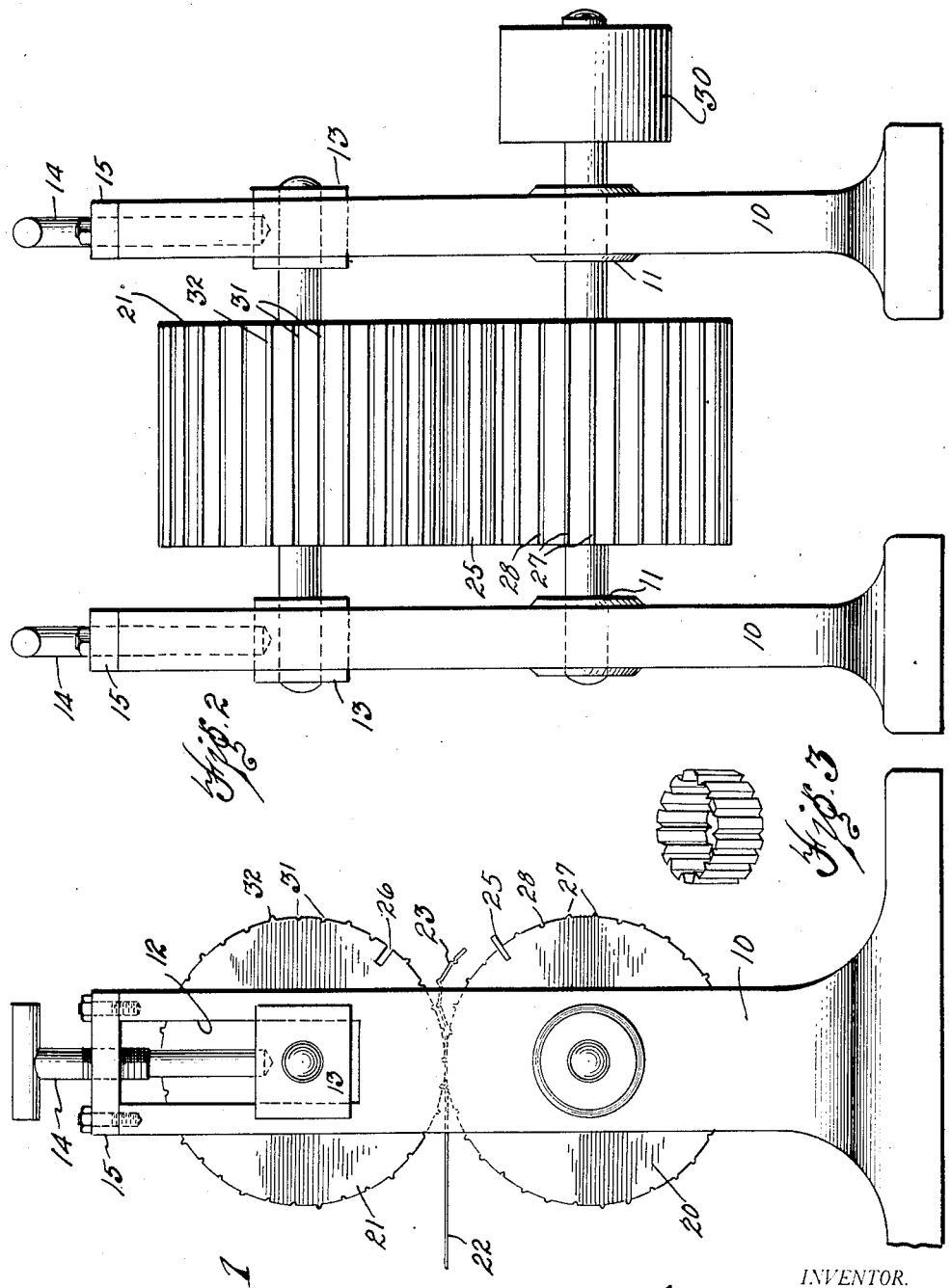
INVENTOR.
Jasper F. Cullin
BY
Francis D. Hardesty
ATTORNEY.

Patented Feb. 25, 1930

1,748,381

UNITED STATES PATENT OFFICE

JASPER F. CULLIN, OF DETROIT, MICHIGAN

ELECTRICAL INSULATION AND MEANS FOR MAKING THE SAME

Application filed June 8, 1927. Serial No. 197,419.

The present invention relates to paper strips for electrical insulation purposes and means for making same.

In the production of those types of motor armatures involving windings placed longitudinally in slots in the armature body or core, a lining of paper in the slots is used to insulate the windings from the walls and bottom of the slots. Heretofore it has been customary to place a suitable strip of paper in each slot by hand. The present inventor however has devised a machine for making such insertions and has made application for U. S. Letters Patent therefor under Ser. No. 197,420, filed June 8, 1927 now Patent No. 1,668,192. The operation of the said machine is facilitated by preliminarily creasing at suitable measured distances a strip of the paper cut to the proper length and it is therefore the principal object of the present invention to prepare these strips.

Other objects will readily occur to those skilled in the art upon reference to the following description and accompanying drawings in which:—

Fig. 1 is an end elevation of a machine embodying the present invention;

Fig. 2 is a front elevation of the same; and

Fig. 3 is a perspective view of one of the strips.

As indicated, the present machine consists of a pair of upright frames 10 having fixed bearings 11 and slotted as at 12 for the reception of the bearing blocks 13 adjustable downward by means of the screws 14 threaded in the plates 15 bolted or otherwise secured over slots 12.

Carried in bearings 11 and 13 is a pair of rolls 20 and 21 respectively and these are adjustable toward toward each other by the screws 14. These rolls are provided with inter-engaging ribs and grooves adapted to act on a strip of paper 22 passed between them. It will be noted that roll 20 has its ribs 27 and grooves 28 arranged so that there are alternately two ribs and one groove while the roll 21 has alternately two grooves 31 and one rib 32. The strip 22 will therefore receive alternately two creases in one direction and one crease in the other direction as indicated at 23.

Rolls 20 and 21 will also be provided with a suitable cutting off device so that at each revolution a length of the strip will be cut off. This device is indicated as a knife 25 in one roll and a suitable slot 26 in the other.

Power may be applied to the rolls through a pulley 30 secured to the shaft of one of the rolls.

The product of the machine is shown in perspective in Fig. 3.

It should be noted that the ribs and grooves on the rolls are equally spaced about the periphery of the rolls and it is preferred that the distance between the rib and groove adjacent the cutting off device be slightly less than twice the distance between any other rib and groove. This permits easily lapping the two uncreased ends of the strip to form it into a ring as shown in Fig. 3.

Now having described the invention and the preferred form of embodiment thereof, it is to be understood that said invention is to be limited, not to the specific details herein set forth but, only by the scope of the claims which follow.

I claim:—

1. As a new article of manufacture, an insulating strip for slotted armatures of electric devices, being laterally creased at substantially equal spaces, the creases alternating two in one direction with one in the other direction, there being as many of the latter creases as there are slots in the armature for which it is to be used.

2. As a new article of manufacture, an insulating strip for slotted armatures of electric devices, being laterally creased at substantially equal spaces, the creases alternating two in one direction with one in the other direction, there being as many of the latter creases as there are slots in the armature for which it is to be used and being uncreased at its ends for a distance less than the distance between creases.

JASPER F. CULLIN.